(12) United States Patent
Hayashi et al.

(10) Patent No.: US 7,378,970 B2
(45) Date of Patent: May 27, 2008

(54) DISK TAG READING DEVICE

(75) Inventors: Hiroyuki Hayashi, Kawasaki (JP);
Toru Maniwa, Kawasaki (JP); Andrey Andrenko, Kawasaki (JP); Manabu Kai, Kawasaki (JP); Takeshi Takano, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 754 days.

(21) Appl. No.: 11/001,507

(22) Filed: Dec. 1, 2004

(65) Prior Publication Data

US 2006/0023575 A1 Feb. 2, 2006

(30) Foreign Application Priority Data

Jul. 27, 2004 (JP) ............... 2004-219222

(51) Int. Cl.
*G08B 13/14* (2006.01)

(52) U.S. Cl. ............... 340/572.7; 700/222; 369/30.37

(58) Field of Classification Search .. 340/572.1–572.9; 700/213, 214, 215, 222, 225, 231, 236; 369/30.37
See application file for complete search history.

(56) References Cited

U.S. PATENT DOCUMENTS

| | | | | |
|---|---|---|---|---|
| 5,119,353 A | * | 6/1992 | Asakura | ............... 369/13.01 |
| 5,604,485 A | * | 2/1997 | Lauro et al. | .............. 340/572.5 |
| 5,669,494 A | * | 9/1997 | Geffen | ........................ 358/1.15 |
| 7,197,649 B1 | * | 3/2007 | Fausse | ........................ 713/193 |
| 7,256,698 B2 | * | 8/2007 | Su | ........................ 340/572.8 |
| 2007/0108292 A1 | * | 5/2007 | Montague | .................. 235/487 |

FOREIGN PATENT DOCUMENTS

| | | |
|---|---|---|
| EP | 000849734 A2 * | 12/1997 |
| JP | 2001-357366 | 12/2001 |
| JP | 2003-069549 | 3/2003 |

OTHER PUBLICATIONS

A.I. Nosich et al. Waveguide Properties of Open Metallized Dielectric Transmission Lines of the Cylindrical Type. Radio Engn. Electronic Physics vol. 24, pp. 1-9, Scripta Publishing Co. 1980.
K. Fujimoto et al. Mobile Antenna Systems Handbook. pp. 345-351 Artech House Publishers. 1994.

* cited by examiner

*Primary Examiner*—Davetta W. Goins
*Assistant Examiner*—Edny Labbees
(74) *Attorney, Agent, or Firm*—Katten Muchin Rosenman LLP (57) ABSTRACT

A disk tag reading device is a device for reading contents of an electronic tag attached to a disk. A holder which is inserted into a central hole of the disk configures an antenna for communicating with the electronic tag attached to the disk.

10 Claims, 12 Drawing Sheets

DISK TAG READING DEVICE

BACKGROUND OF THE INVENTION

1. Field of the Invention

The present invention relates to a system method for reading an electronic tag such as an RFID, etc., and more particularly, to a disk tag reading device for reading contents of a tag attached to a disk such as a CD, a DVD, etc.

2. Description of the Related Art

In recent years, attention has been paid to an RFID (Radio Frequency Identification) system as a system for managing parts or an inventory. For example, if the production or distribution of CDs, DVDs, etc., tags of as many stacked CDs or DVDs as possible must be collectively read. However, if many CDs or DVDs are stacked, there is a problem that the number of readable CDs or DVDs is reduced due to an influence of a recording medium (metal portion) of a CD or a DVD.

Figure 1:
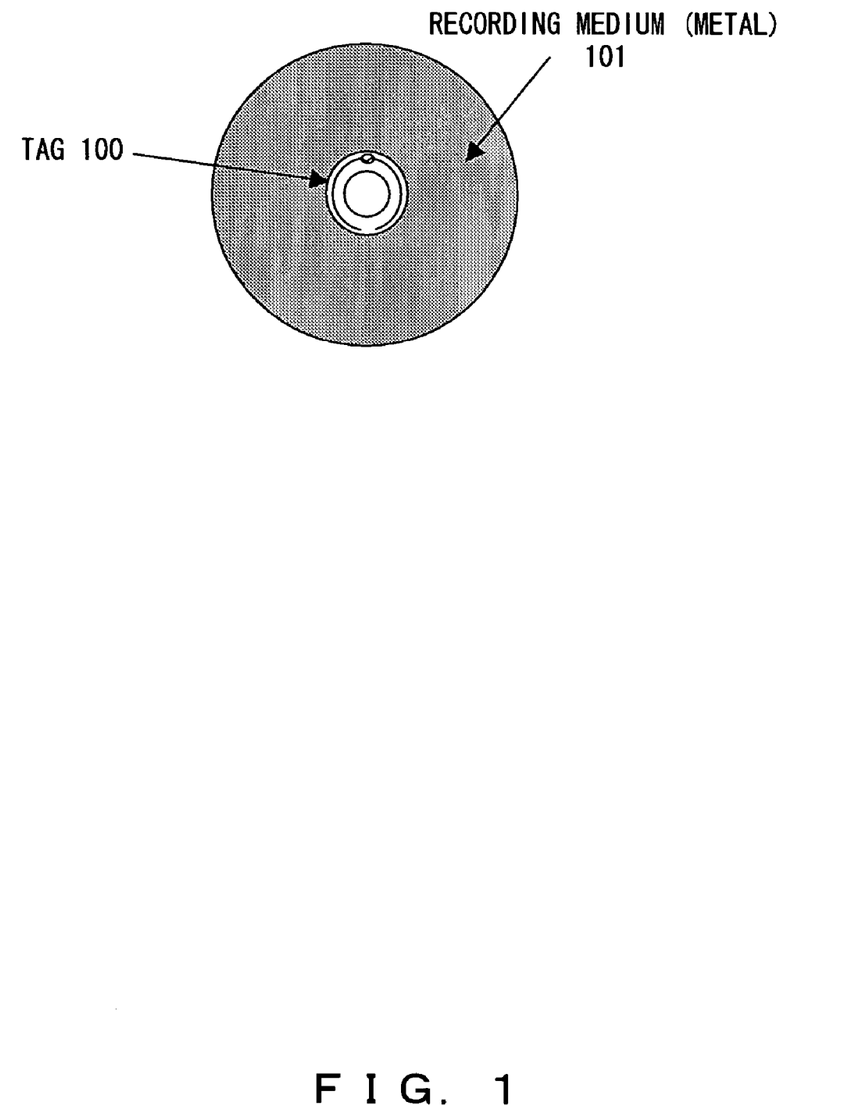
FIG. 1 explains a CD to which a tag is attached.

FIG. 1 explains a CD to which a tag is attached. The tag 100 is attached to the proximity of the center of the CD, and a recording medium (metal portion) 101 exists outside the tag.

Figure 2:
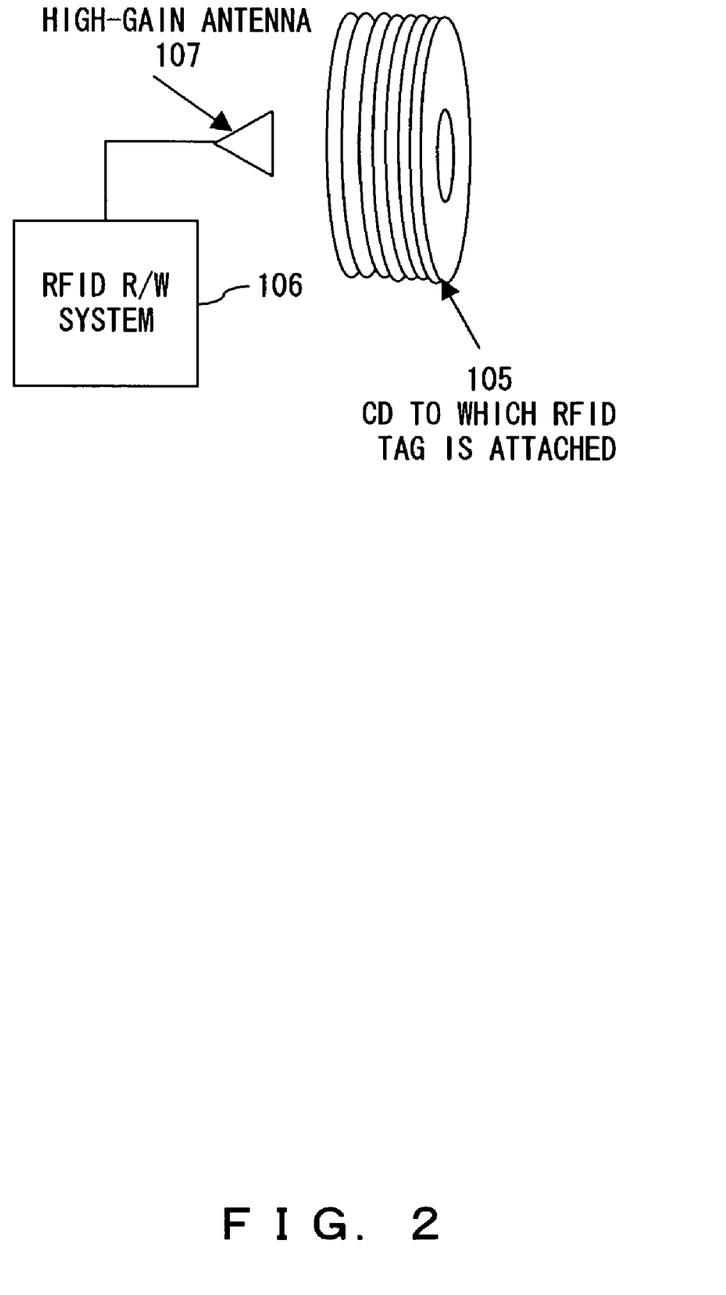
FIG. 2 explains a conventional example of a tag reading system.

FIG. 2 explains a conventional example of a reading system, for example, in a case where many CDs are stacked. In this figure, a method for reading contents of a tag by connecting a high-gain antenna 107 to an RFID reader/writer system 106, and by making the antenna 107 close to the CD is used if contents of tags are read from many CDs to which RFID tags are attached. This method, however, has a problem that the number of CDs from which data of tags can be accurately read becomes small among the stacked many CDs as described above.

The following documents exist as conventional techniques for such a system for reading a tag, etc.

[Patent Document 1] Japanese Patent Publication No. 2001-357366 "Antenna Device and Reader/Writer Device"

[Patent Document 2] Japanese Patent Publication No. 2003-69549 "Information Protection Management System Using a Recording Medium Equipped with an RFID"

Patent Document 1 discloses a technique, for example, using a pillar-shaped of coiled insulator based material antenna having a height direction that is an insertion direction into a cylinder in order to communicate with a non-contact data carrier installed on the inner surface of the cylinder.

Patent Document 2 discloses an information protection management system for recording a decryption key to an RFID chip of a recording medium on which encrypted information is recorded, and for decrypting the encrypted information by using the decryption key read from the RFID chip when the encrypted information is read from the medium.

These techniques, however, cannot solve the problem that contents of tags attached to disks cannot be accurately read when many disks such as CDs, DVDs, etc. are stacked.

SUMMARY OF THE INVENTION

An object of the present invention is to enable contents of electronic tags attached to many disks such as CDs, DVDs, etc. to be accurately read by reducing an influence of a recording medium (metal portion) of a CD or a DVD.

A disk tag reading device according to the present invention is a device for reading contents of an electronic tag attached to a disk. A holder which is inserted into the central hole of the disk configures an antenna for communicating with the electronic tag attached to the disk.

DESCRIPTION OF THE PREFERRED EMBODIMENTS

Figure 3:
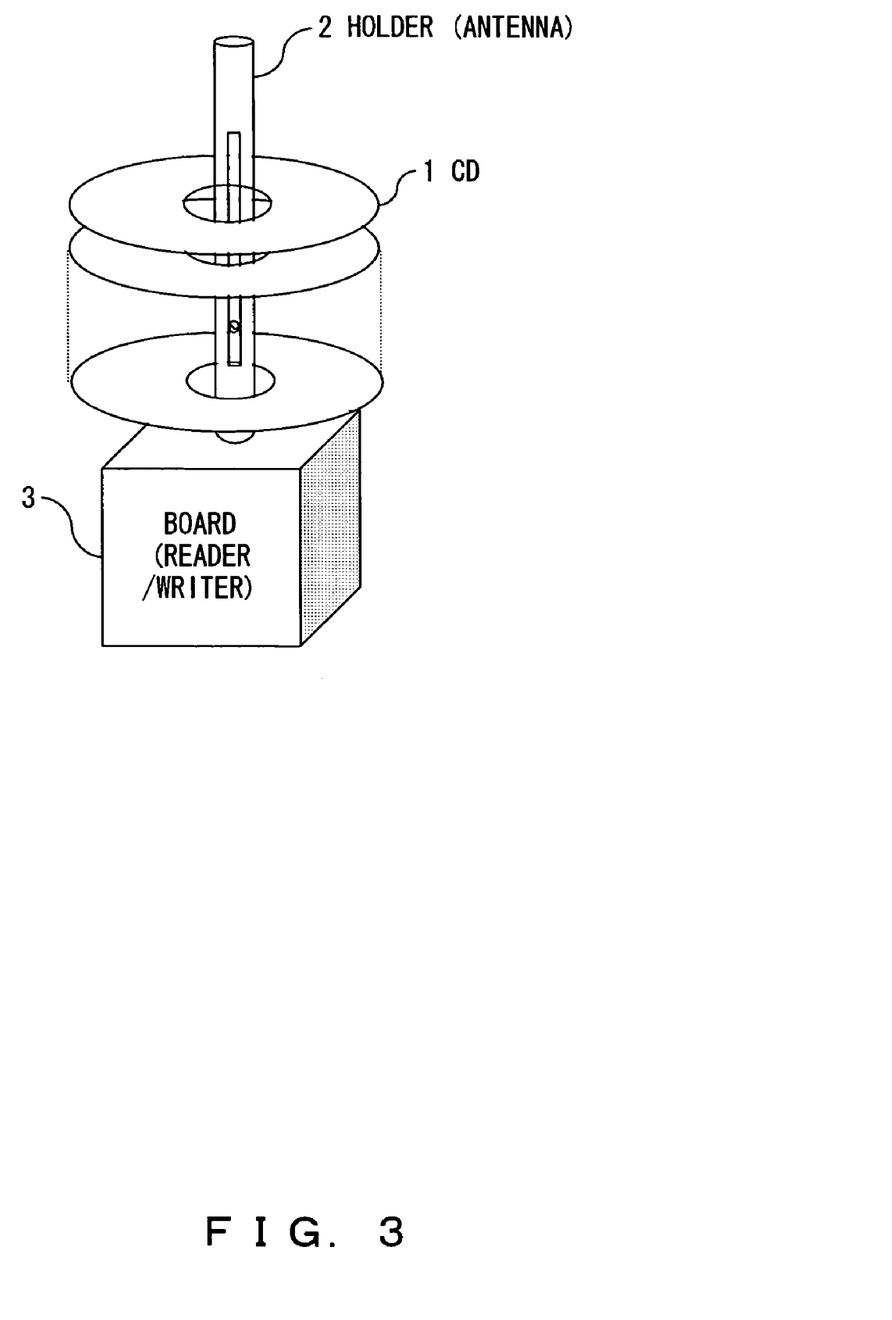
FIG. 3 explains an example of a principle configuration of a disk tag reading device according to the present invention.

FIG. 3 explains the principle of a disk tag reading device according to the present invention. This figure shows a device for reading contents of an electronic tag, for example, an RFID attached to a disk such as a CD, a DVD, etc. A holder 2 which is inserted into the central hole of the disk such as a CD 1, configures an antenna for communicating with the electronic tag attached to the disk. This device may also comprise a reader/writer for reading, by way of example, within a base 3 of the holder 2.

In a preferred embodiment according to the present invention, a connector that can be connected by being plugged in a connector arranged on the side of the base 3 of the holder 2 may be comprised as a connector connected to a coaxial cable connected to the antenna, or an antenna for communicating with the antenna provided on the side of the base 3 of the holder 2 may be comprised as the antenna connected to the coaxial cable.

Additionally, in the preferred embodiment, the holder 2 is a hollow pipe having a diameter smaller than the hole of the disk, comprises a slot having a length of a half wavelength of an electric wave for communicating with the tag in a direction parallel or oblique to the longitudinal direction of the hollow pipe, or in a spiral state, and can configure a slot antenna as the antenna. Or, the holder 2 may further comprise a slit in the longitudinal direction of the hollow pipe in this case. Besides, a material of whole, an inner surface, or an outer surface of the holder 2 may be a conductor.

Furthermore, in the preferred embodiment, the holder 2 may be the above described hollow pipe, may have a plurality of open windows arranged in the longitudinal direction of the hollow pipe, can comprise a thin conductor in a position of the central axis of the hollow pipe, and can configure an electromagnetic wave leak antenna as the antenna.

Still further, in the preferred embodiment, the holder 2 may have a slit in the longitudinal direction of the above described hollow pipe, dielectric discs having the same diameter as the inner diameter of the hollow pipe are installed at predetermined intervals within the hollow pipe, and the holder 2 can configure a billiotic grading cylinder slot antenna as the antenna.

Still further, in the preferred embodiment, the holder 2 may comprise a slit in the longitudinal direction of the above described hollow pipe, may comprise a slot having a length of a half wavelength of an electric wave for communicating with the tag in the longitudinal direction of the hollow pipe, a dielectric film, to which conductive foil having a narrow width for communicating with the tag is pasted, is pasted to the inner or outer side of the hollow pipe so that part of the conductive foil aligns with part of the slot via the dielectric film, whereby a slot antenna can be configured as the antenna.

According to the present invention, a holder which is inserted into the central hole of a disk is used as an antenna for communicating with a tag attached to the disk such as a CD, a DVD, etc., whereby contents of the electronic tag attached to the disk can be accurately read even if many disks are stacked.

Figure 4:
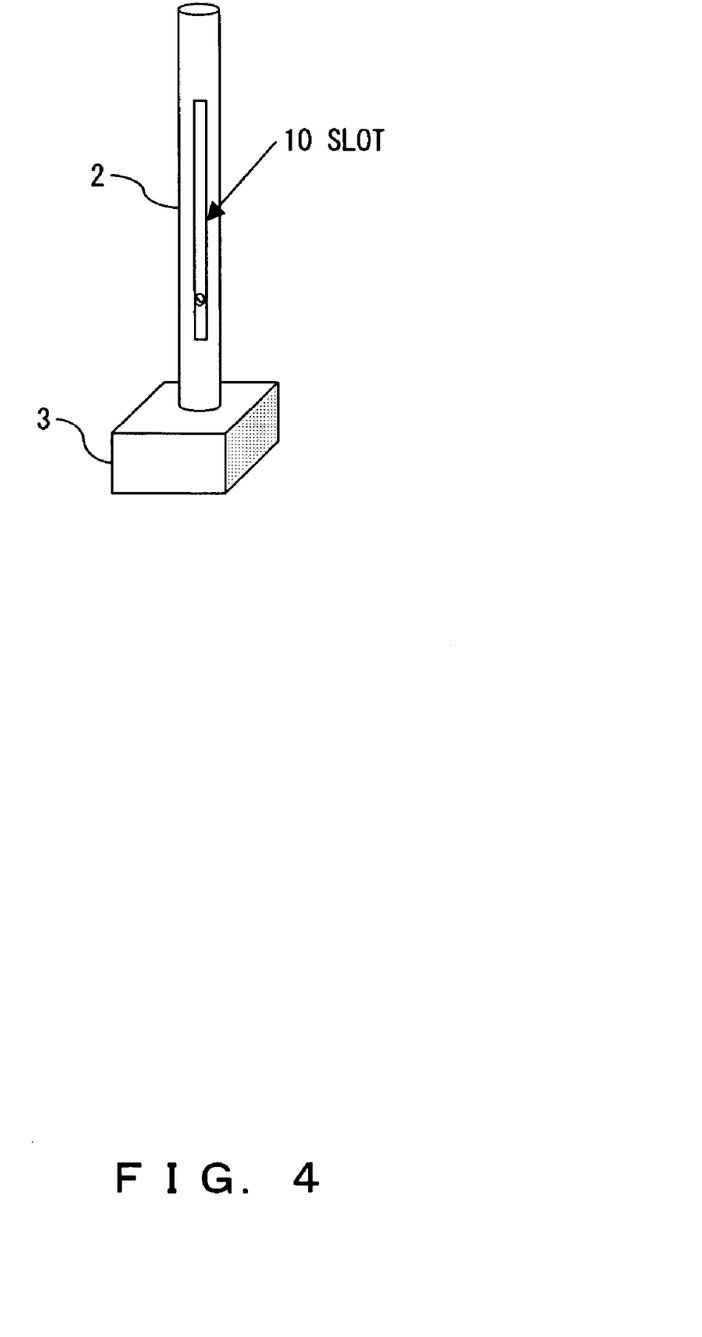
FIG. 4 explains a configuration example (No. 1) of a slot antenna for reading a disk tag.
Figure 5:
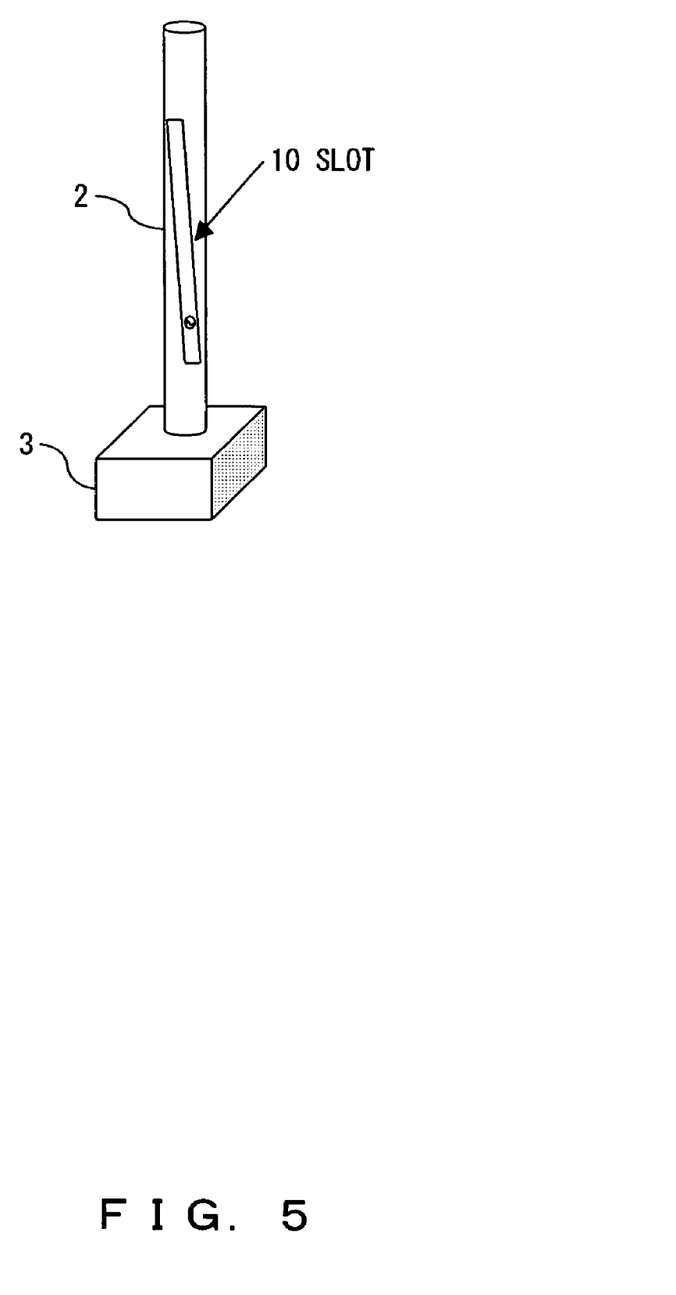
FIG. 5 explains a configuration example (No. 2) of a slot antenna for reading a disk tag.
Figure 6:
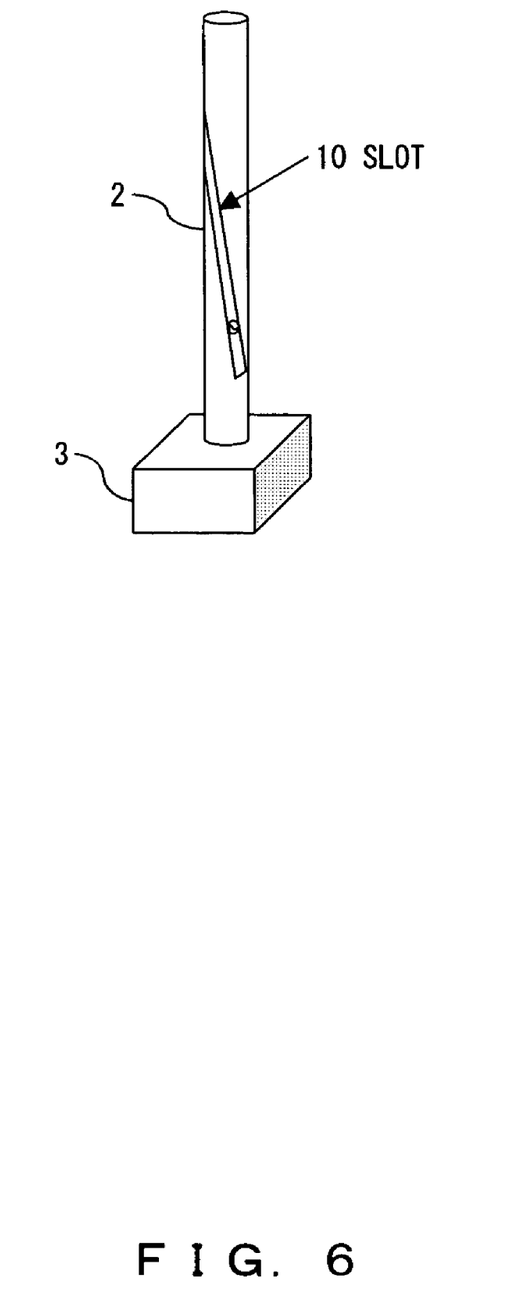
FIG. 6 explains a configuration example (No. 3) of a slot antenna for reading a disk tag.

FIGS. 4 to 6 explain a disk tag reading device using a holder which is inserted into a hole of a disk such as a CD, a DVD, etc., as a slot antenna. Similar to FIG. 3, the holder 2 into which a CD, etc. is inserted is used as an antenna, which is connected by cable or radio to a reader/writer comprised within a base 3. In FIG. 4, a linear slot 10 is notched in parallel to the longitudinal direction of the holder, so that a slot antenna is formed as an antenna. This slot is assumed to be, for example, a linear slot having a length of an approximately half wavelength of an electric wave for communicating with a tag of a CD.

The slot antenna shown in FIG. 4 is formed by pasting copper foil, on which a slot is notched in the longitudinal direction, to a round bar of, for example, Teflon (registered trademark). Assume that the length of the antenna is 260 mm, its diameter is 12 mm, and the central frequency of an electric wave used is 915 MHz. Also assume that a wavelength $\lambda$ in a vacuum is approximately 328 mm, the relative dielectric constant of Teflon (registered trademark) is 2.2. In this case, $\lambda_g = \lambda/\sqrt{\epsilon_r} = 222$ mm, and $\lambda_g/2 = 111$ mm (a calculation value of the length of the slot). However, the length of the slot can be, for example, approximately 120 mm in correspondence, for example, with impedance matching.

In FIG. 5, the slot 10 is notched at a relatively small angle obliquely to the longitudinal direction of the holder 2, so that a slot antenna is similarly configured. This slot antenna is effective for reading a tag, for example, even in a state where a CD, etc. is obliquely inserted into the holder 2.

In FIG. 6, a slot 10 is configured by being cut in a spiral state in the longitudinal direction of the holder 2. For example, the slot that forms a considerably large angle in the longitudinal direction of the holder 2 is cut, for example, on a flat board before a hollow cylinder is formed, and the disc is rolled within the hollow cylinder, whereby the slot in the spiral state is formed.

Figure 7:
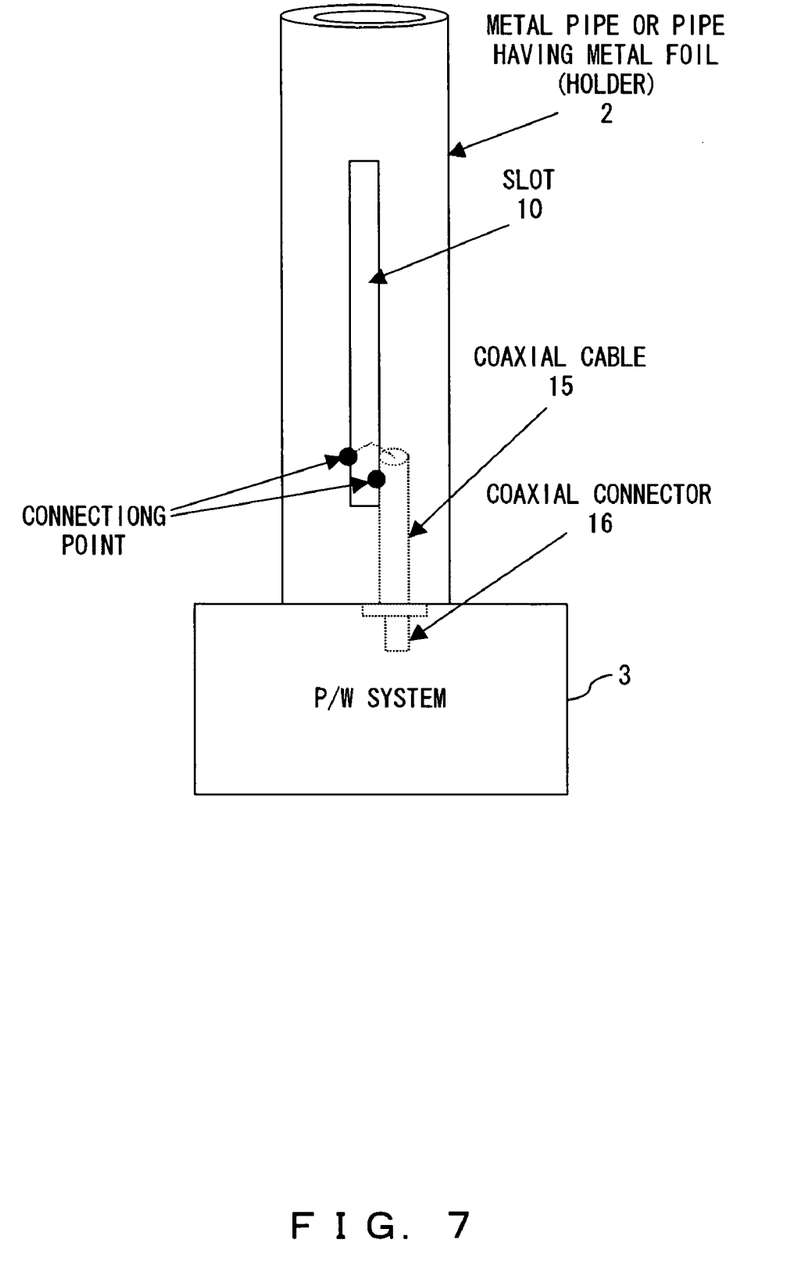
FIG. 7 explains a method for supplying power to a slot antenna.

FIG. 7 explains a method supplying power, for example, to the slot antenna shown in FIG. 4. In this figure, the holder 2 is entirely a metal pipe, or a pipe having an outer or inner surface around which an electric conductor such as metal foil, etc. is wound. Additionally, the core wire and the shield of a coaxial cable 15 are connected to the bottom of the slot 10, and the coaxial cable 15 is connected by a coaxial connector 16 to a reader/writer system within a base 3 of the holder 2.

Figure 8:
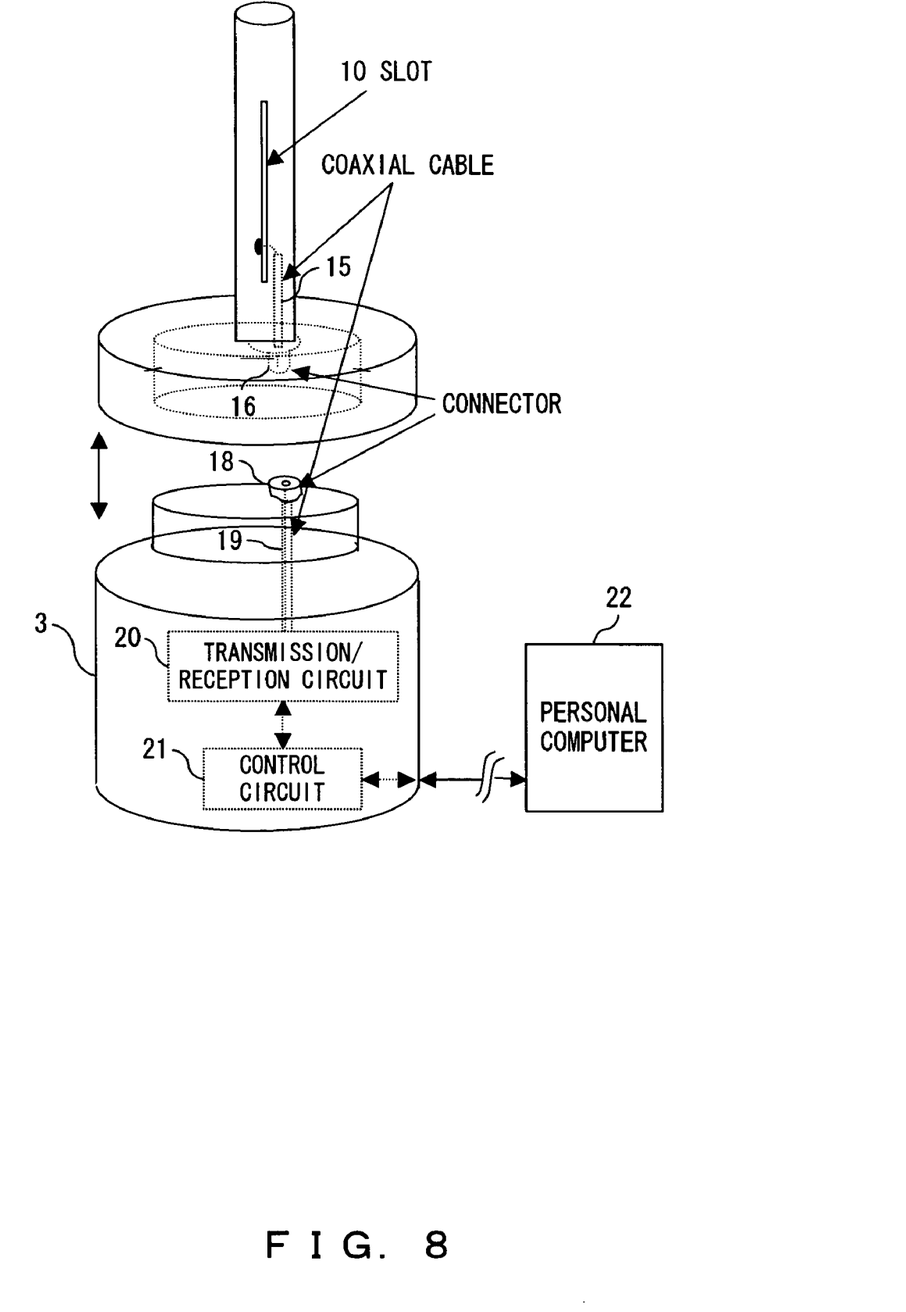
FIG. 8 shows a configuration example of a tag reading device using a plug-in connection of a connector.

FIG. 8 explains a plug-in connection between a connector on the side of the holder, which is connected to the reader/writer antenna, and the connector on the side of the reader/writer within the base 3. In this figure, the coaxial connector 16, which is explained with reference to FIG. 7 and connected to the coaxial cable 15 on the side of the holder, is plugged in the connector 18 arranged on the side of the base 3, and connected to a personal computer 22 via a coaxial cable 19 on the side of the base 3, a transmission/reception circuit 20, a control circuit 21, etc., so that tags of, for example, many CDs, DVDs, etc. are collectively read.

Figure 9:
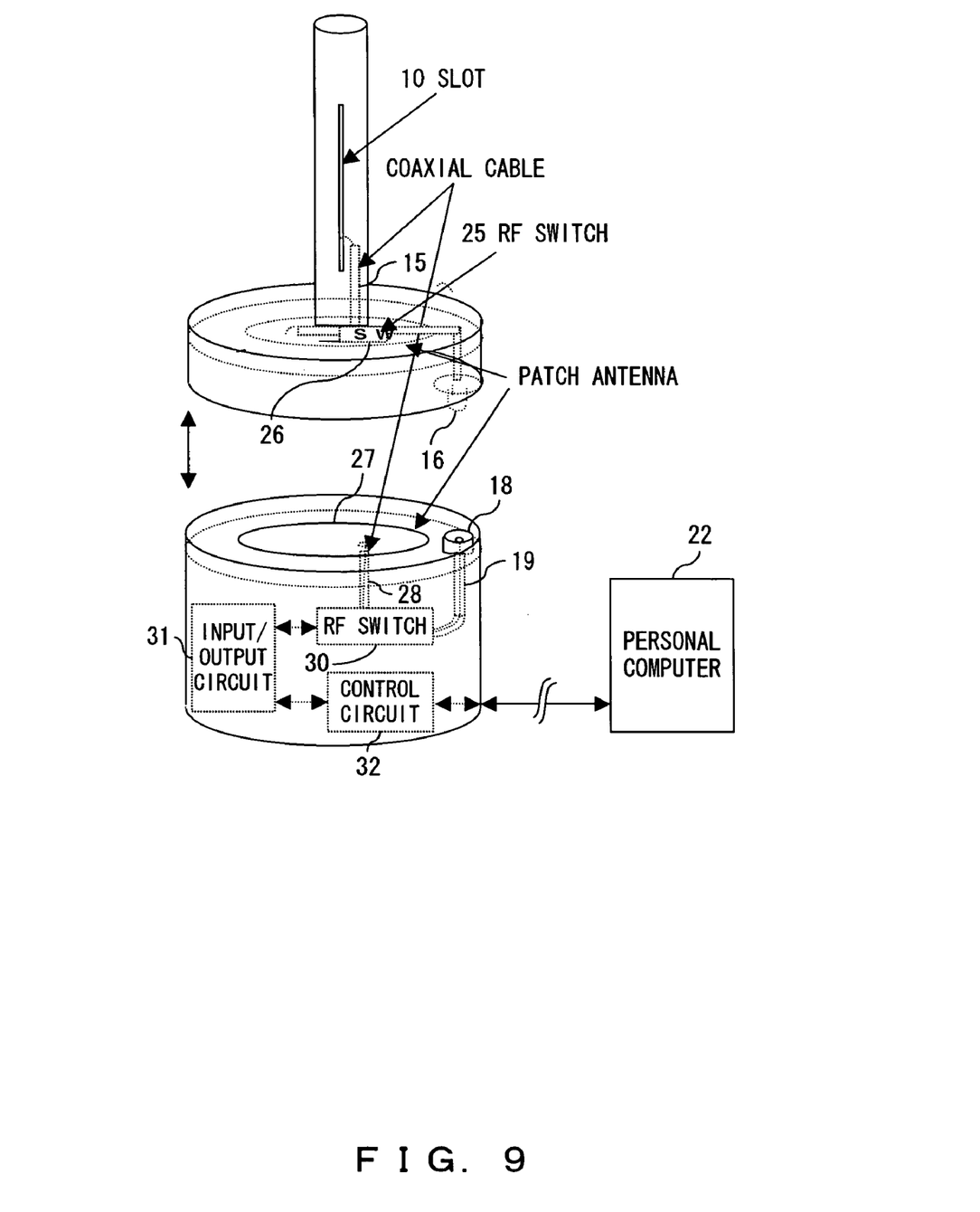
FIG. 9 shows a configuration example of a tag reading device for switching between a plug-in connection of a connector and a wireless connection.

FIG. 9 shows a configuration example of a collective tag reading system that comprises patch antennas on the sides of the holder 2 and the base 3 in addition to the connectors for the connection on the side of the base 3, and can switch between a connection via the connectors and a wireless connection using the patch antennas. In this figure, the connectors 16 and 18 are provided, for example, further outer than in FIG. 8. The patch antennas 26 and 27 are respectively provided on the side of the holder 2 and the side of the base 3. Additionally, an RF switch 25 for switching a connection between the coaxial cable 15 and the connector 16 or the patch antenna 26 is comprised. In the meantime, an RF switch 30 for switching a connection between the coaxial cable 28 connected to the patch antenna 27 or the coaxial cable 19 connected to the connector 18 and an input/output circuit 31 is similarly comprised. Read data is given to the personal computer 22 via the RF switch 30, the input/output circuit 31, and the control circuit 32.

Figure 10:
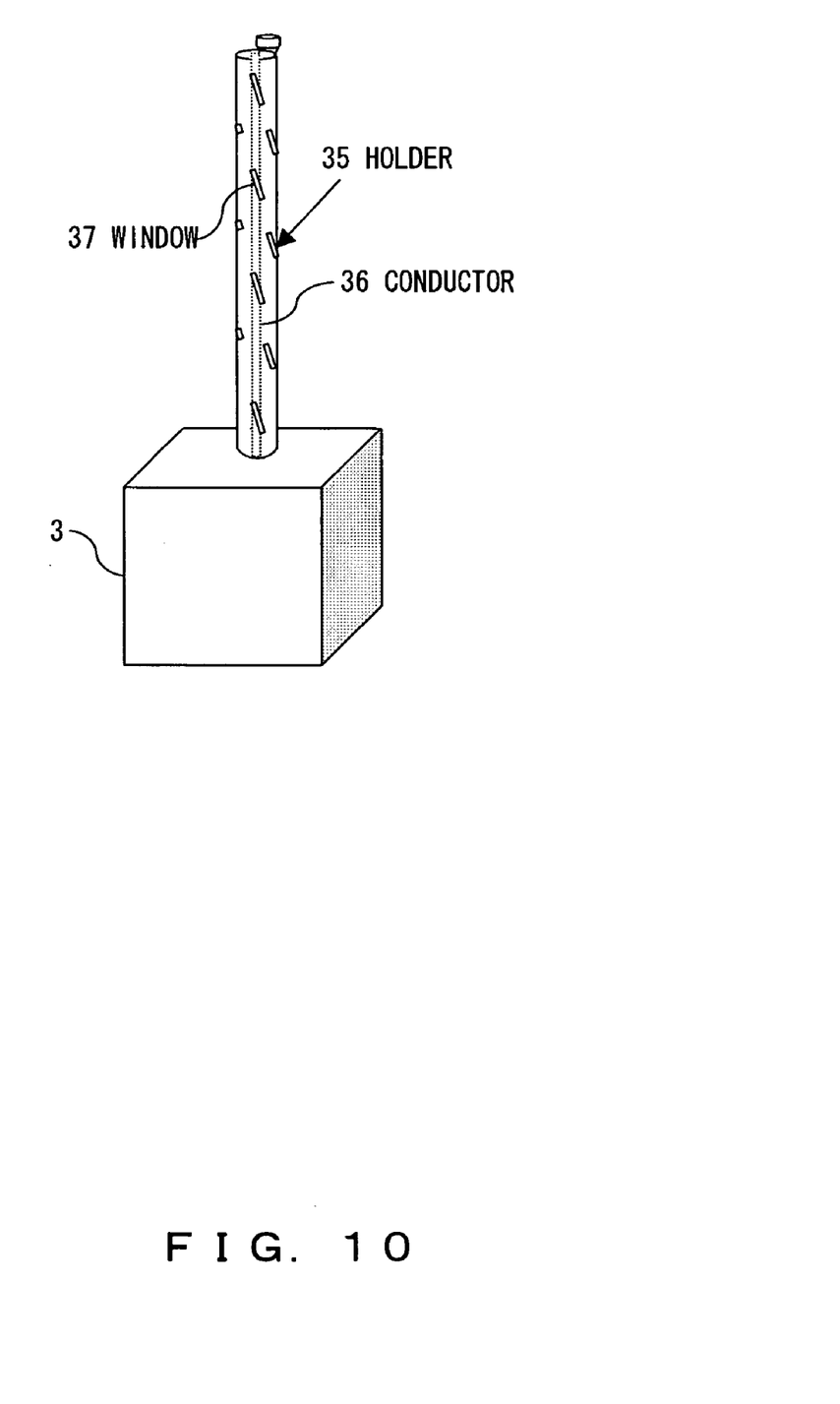
FIG. 10 explains an electromagnetic wave leak antenna for reading a disk tag.
Figure 11:
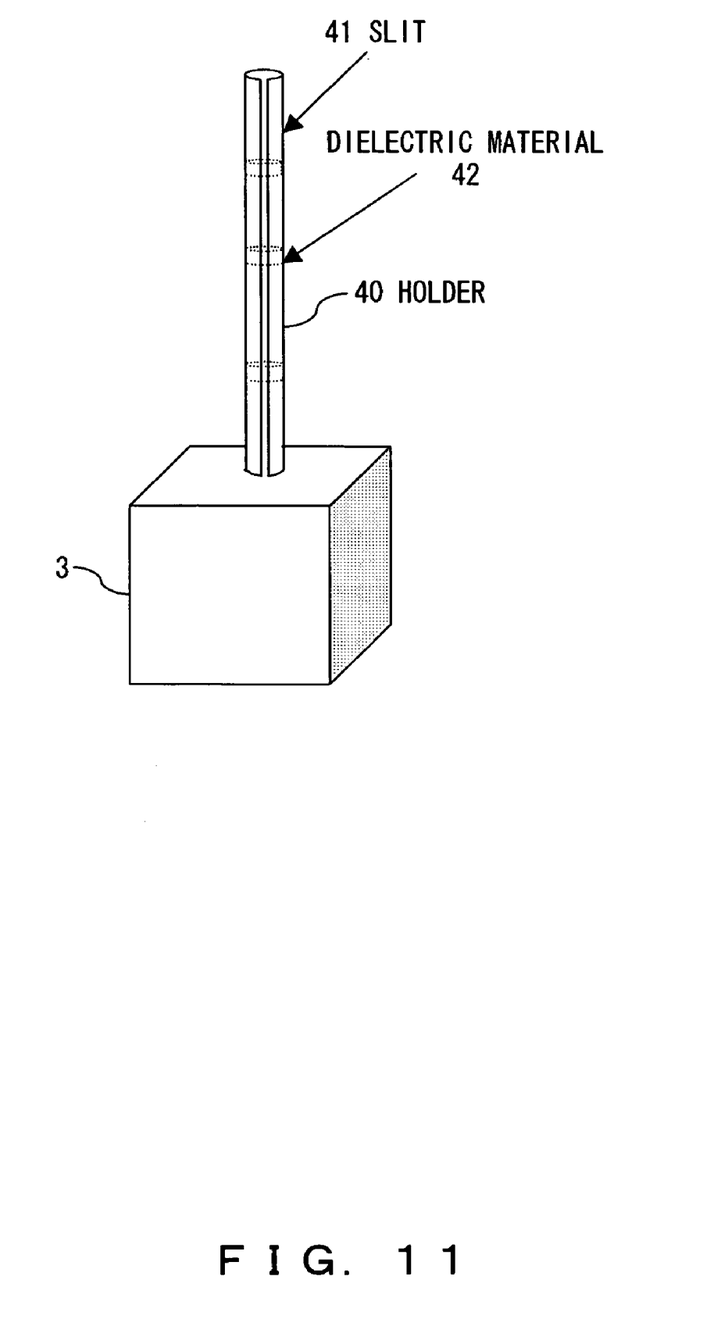
FIG. 11 shows a configuration example of a billiotic grading cylinder slot antenna for reading a disk tag.

FIGS. 10 and 11 explain an example where an antenna in a form other than the above described normal slot antenna is arranged as a holder. In FIG. 10, the holder 35 is a hollow pipe that is thinner than the central hole of a CD, a DVD, etc., and its whole is a conductor such as a metal, etc., or the holder 35 is a pipe having an outer or inner surface to which metal foil is pasted. In FIG. 10, a thin conductor 36 is comprised in a position of the central axis of the hollow pipe. Additionally, many open windows 37 are provided generally to form a small angle with the longitudinal direction of the hollow conductor, so that an electromagnetic wave leak antenna is formed as a whole. Generally, the thin conductor 36 on the central axis is set so that characteristic impedance between the hollow pipe and the conductor 36 matches the characteristic impedance of the coaxial cable connected. This electromagnetic leak antenna is disclosed by the following document.

[Non-Patent Document 1] K. Fujimoto, J. R. James "Mobile Antenna Systems Handbook, pp. 345-351, Artech House Publishers, Boston/London (1994)

FIG. 11 shows a configuration of a billiotic grading cylinder slot antenna as another antenna form. Also in this figure, a holder 40 is a hollow metal pipe thinner than a hole of a disk, or a pipe having an outer or inner surface to which metal foil is pasted. For example, the metal pipe does not form a full circle, namely, the metal pipe has a slit in its entirety, and dielectric discs, namely, dielectric discs having a diameter almost equal to the inner diameter of the hollow pipe are installed at predetermined intervals within the pipe, whereby a billiotic grading cylinder slot antenna is formed. The following document discloses this billiotic grading cylinder slot antenna.

[Non-Patent Document 2] A. I. Nosich and V. P. Shestopalov, "Waveguide Properties of Open Metalized Dielectric Transmission Lines of the Cylindrical Type", Radio Engn. Electronic Physics (Engl. transl.), vol. 24, pp. 1-9, Scripta Publ. (1980)

Figure 12:
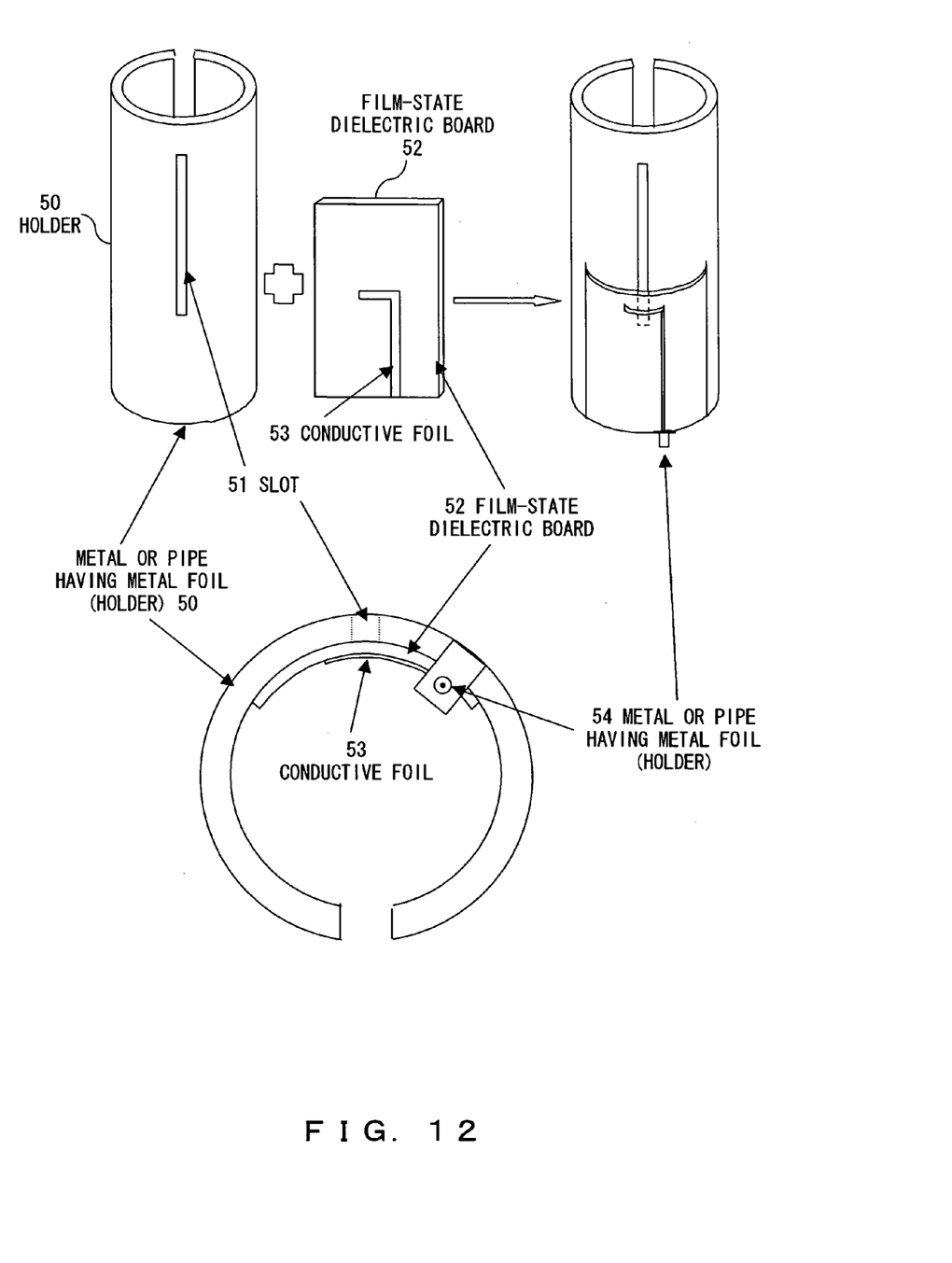
FIG. 12 explains a configuration example of a slot antenna for facilitating manufacturing.

A configuration example of a slot antenna for facilitating its manufacturing is explained last with reference to FIG. 12. This antenna is a slot antenna as a whole. A holder 50 is, for example, a hollow cylinder having a slit that does not form a full circle, and a slot 51 having a length of approximately a half wavelength is notched in the longitudinal direction of the hollow pipe. By providing the slit, the input impedance of the antenna can be reduced, and becomes easy to match the coaxial cable of a characteristic impedance of 50 Ω. In FIG. 7, the core wire and the shield of the coaxial connector are connected to the bottom of the slot. Generally, their connection method is soldering. Since it is very difficult to connect the core wire and the shield of the coaxial cable in a position where the characteristic impedance becomes 50Ω to make the impedance matching. Therefore, a 50-Ω micro-strip line is used instead of the coaxial cable in FIG. 12. The micro-strip line is composed of a line formed by a conductive film, a film-state dielectric material, and a conductor of the antenna. The width of the line is determined so that the characteristic impedance becomes 50Ω. The micro-strip line is connected to the core wire of the coaxial connector. The ground of the coaxial connector is connected to the conductor of the antenna.

Namely, conductor foil 53 having a narrow width is pasted to a dielectric board 52 that is relatively soft in a film state as shown in FIG. 12, and the dielectric board 52 is pasted to the outside or inside of the hollow pipe so that the conductive foil 53 does not directly contact the metal pipe, namely, the conductive foil 53 is positioned in a lower position of the slot 51 via the film-state dielectric board 52. A position in which the film-state dielectric board 52 is pasted is adjusted to make the impedance matching with the impedance 50Ω of the coaxial cable on the side of the reader/writer system (base 3) connected to the coaxial connector 54, whereby the adjustment of the impedance matching becomes easier than the connection of the coaxial cable 15 to a suitable position of the slot 10 as explained with reference to FIG. 7. The coaxial connector 54 is plugged, for example, in the connector shown in FIG. 8, whereby a connection to the side of the reader/writer is made.

As described above, according to the present invention, a holder of a disk is used as an antenna, whereby accurate reading can be made even if disks (20 disks or more) are stacked by the length of a slot, for example, in contrast with a case where contents of tags of only a few disks can be read with the system according to the conventional technique shown in FIG. 2.

Additionally, the above provided explanation refers to the usage of a holder as an antenna by mainly focusing on a data read of tags. However, this antenna is also available as a data write of tags as a matter of course.

What is claimed is:

1. A disk tag reading device for reading contents of an electronic tag attached to a disk, wherein
a holder which is inserted into a central hole of the disk configures an antenna for communicating with the electronic tag attached to the disk.

2. The disk tag reading device according to claim 1, further comprising
a connector, which is connected to an opposite side of a coaxial cable connected to the antenna, and can be connected by being plugged in a connector arranged on a side of a base of the holder.

3. The disk tag reading device according to claim 1, further comprising
an antenna, which is connected to an opposite side of a coaxial cable connected to the antenna, for communicating with an antenna comprised on a side of a base of the holder.

4. The disk tag reading device according to claim 1, wherein:
the holder is a hollow pipe having an outside diameter smaller than the hole of the disk, and a whole, an inner or outer surface that is a conductor; and
the holder comprises a slot having a length of a half wavelength of an electric wave for communicating with the tag in parallel to a longitudinal direction of the hollow pipe, and configures a slot antenna as the antenna.

5. The disk tag reading device according to claim 1, wherein:
the holder is a hollow pipe having an outside diameter smaller than the hole of the disk, and a whole, an inner or outer surface that is a conductor; and
the holder comprises a slot having a length of a half wavelength of an electric wave for communicating with the tag in a direction obliquely to a longitudinal direction of the hollow pipe, and configures a slot antenna as the antenna.

6. The disk tag reading device according to claim 1, wherein:
the holder is a hollow pipe having an outside diameter smaller than the hole of the disk, and a whole, an inner or outer surface that is a conductor; and
the holder comprises a slot having a length of a half wavelength of an electric wave for communicating with the tag in a spiral state in a longitudinal direction of the hollow pipe, and configures a slot antenna as the antenna.

7. The disk tag reading device according to claim 1, wherein:
the holder is a hollow pipe having an outside diameter smaller than the hole of the disk, and a whole, an inner or outer surface that is a conductor; and
the holder comprises a slit at least in a longitudinal direction of a conductor portion of the hollow pipe, comprises a slot having a length of a half wavelength of an electric wave for communicating with the tag in the longitudinal direction of the hollow pipe, and configures a slot antenna as the antenna.

8. The disk tag reading device according to claim 1, wherein:
the holder is a hollow pipe having an outside diameter smaller than the hole of the disk, and a whole, an inner or outer surface that is a conductor;
the holder comprises a plurality of open windows provided in a longitudinal direction of the hollow pipe; and
the holder further comprises a thin conductor in a position of a central axis of the hollow pipe, so that an electromagnetic wave leak antenna is configured as the antenna.

9. The disk tag reading device according to claim 1, wherein:
the holder is a hollow pipe having an outside diameter smaller than the hole of the disk, and a whole, an inner or outer surface that is a conductor;
the holder comprises a slit at least in a longitudinal direction of a conductor portion of the hollow pipe; and dielectric discs having a same diameter as an inner diameter of the hollow pipe are installed at predetermined intervals within the hollow pipe, so that a billiotic grating cylinder slot antenna is configured as the antenna.

10. The disk tag reading device according to claim 1, wherein:

the holder is a hollow pipe having an outside diameter smaller than the hole of the disk:

the holder comprises a slit in a longitudinal direction of the hollow pipe, and a slot having a length of a half wavelength of an electric wave for communicating with the tag in parallel to the longitudinal direction of the hollow pipe; and a dielectric film, to which conductive foil having a narrow width for connecting the antenna to a reader/writer of the tag is pasted, is pasted to an inside or outside of the hollow pipe so that part of the conductive foil aligns with part of the slot via the dielectric film, and a slot antenna is configured as the antenna.

* * * * *